United States Patent [19]

Blackburn et al.

[11] Patent Number: 5,221,646
[45] Date of Patent: Jun. 22, 1993

US005221646A

[54] NEUTRON ABSORBING GLASS COMPOSITIONS

[75] Inventors: Douglas H. Blackburn, Damascus, Md.; Craig Stone, San Jose, Calif.; David C. Cranmer, Brookeville, Md.; Dale A. Kauffman, Frederick, Md.; James Grundl, Gaithersburg, Md.

[73] Assignee: The United States of America as represented by the Secretary of Commerce, Washington, D.C.

[21] Appl. No.: 730,144

[22] Filed: Jul. 15, 1991

[51] Int. Cl.$^5$ ............................................. C03C 3/076
[52] U.S. Cl. ......................................... 501/55; 501/62; 501/68; 252/478
[58] Field of Search ............................. 501/55, 62, 68; 252/478

[56] References Cited

U.S. PATENT DOCUMENTS

| | | | |
|---|---|---|---|
| 2,736,714 | 2/1956 | Tiede | 252/478 |
| 3,216,808 | 11/1965 | Bishop et al. | 65/18 |
| 3,369,961 | 1/1964 | Dalton et al. | |
| 3,640,890 | 2/1972 | Lee et al. | 252/301.4 |
| 3,751,387 | 8/1973 | Hall et al. | 252/478 |
| 3,808,154 | 4/1974 | Omori | 252/478 |
| 4,255,199 | 3/1981 | Reade | 501/62 |
| 4,520,115 | 5/1985 | Speit et al. | 501/62 |
| 5,073,524 | 12/1991 | Speit | 501/57 |

FOREIGN PATENT DOCUMENTS 1301449 8/1969 Fed. Rep. of Germany.
3635834 5/1988 Fed. Rep. of Germany.

OTHER PUBLICATIONS

Chemical Abstract No. 017:63418r (1987).
Williamson et al, "Iron and Cadmium Capture Gamma-Ray Photofission Measurements," *Nuclear Science and Engineering*, 104, pp. 46-52 (1990).

*Primary Examiner*—Karl Group
*Attorney, Agent, or Firm*—Holly D. Kozlowski

[57] ABSTRACT

Neutron absorbing glass compositions comprise $SiO_2$, $^6Li_2O$ and optionally $Al_2O_3$. The compositions may further include PbO. The compositions provide neutron absorption without release of gamma rays.

15 Claims, No Drawings

NEUTRON ABSORBING GLASS COMPOSITIONS

FIELD OF THE INVENTION

The present invention relates to neutron absorbing glass compositions which may be used in various applications for thermal neutron capture. The glass compositions according to the present invention are advantageous in that neutron absorption is achieved without release of gamma rays.

BACKGROUND OF THE INVENTION

Materials which strongly absorb low energy thermal neutrons are used in various applications, for example, for general radiological shielding, as shielding for neutron detectors, for shielding components of an instrument from neutrons, and to define the collimation of a neutron beam. Boron-containing compounds, gadolinium-containing compounds and cadmium-containing compounds are often used for thermal neutron shielding. However, many of these materials are disadvantageous in that energy which is generated in the materials from the thermal neutron absorption is released from the materials in the form of gamma rays. Thus, additional shielding may be required to reduce the gamma-ray radiation field.

Lithium-6 ($^6Li$) containing materials have also been used in thermal neutron absorbing applications. These materials are advantageous because the excess energy which is generated by the thermal neutron capture results, not in gamma radiation, but in charged particles which generally exhibit no radiological problems. Generally lithium-6 shielding material contains the lithium-6 in the form of either lithium metal or lithium carbonate. However, these materials require encapsulation of the lithium-6, thus restricting use of the material in many applications.

German reference No. DE 3,635,834 discloses radiation shielding glasses comprising cerium-doped alkali metal lead silicate materials. The compositions may contain $^6Li$ for absorption of neutrons. German reference No. 1,301,449 discloses neutron-absorbing glass materials containing $B_2O_3$, $Al_2O_3$, CaO and $Li_2O$. This reference also discloses that the $Li_2O$ may consist of an oxide enriched with $^6Li_2O$. The Reade U.S. Pat. No. 4,255,199 and the Tiede U.S. Pat. No. 2,736,714 disclose alumina silicate glass compositions further containing an alkali metal oxide such as $Li_2O$ and PbO. The Speit et al U.S. Pat. No. 4,520,115 and the Omori U.S. Pat. No. 3,808,154 disclose alkali metal silicate glass compositions which may further contain additional oxide materials. The Lee et al U.S. Pat. No. 3,640,890 discloses glass laser compositions containing $SiO_2$, $Al_2O_3$ and $Li_2O$. Additional silica glass compositions also including $Li_2O$ and/or $Al_2O_3$ are disclosed in the Bishop et al U.S. Pat. No. 3,216,808, the Dalton et al U.S. Pat. No. 3,369,961 and Chemical Abstract No. 107:63418r. The Hall et al U.S. Pat. No. 3,751,387 discloses radiation-shielding cementitious materials which may contain $^6Li$ for thermal neutron capture.

Owing to increasing requirements for radiation shielding devices of various shapes and sizes for use in many different applications, there is a continuing need for new and improved radiation shielding materials.

SUMMARY OF THE INVENTION

Accordingly, it is an object of the present invention to provide novel radiation shielding materials which are capable of absorbing low energy thermal neutrons. It is a further object of the invention to provide such materials which do not release energy in the form of gamma rays. It is a further object of the invention to provide radiation shielding materials capable of absorbing low energy thermal neutrons, which materials may be formed into a variety of shapes and sizes for use in a wide range of applications. It is an additional object of the present invention to provide such materials which may be easily formed and which also exhibit good chemical durability to allow their use in additional applications.

These and additional objects are provided by the present invention which comprises neutron absorbing glass compositions. The compositions comprise silicon dioxide ($SiO_2$), lithium-6 suboxide ($^6Li_2O$) and optionally aluminum oxide ($Al_2O_3$). The glass compositions absorb low energy thermal neutrons and generally do not release excess energy in the form of gamma rays. Additionally, the glass compositions may be readily formed into a variety of shapes and sizes for use as radiation shielding materials in a wide range of applications. The glass compositions may be easily formed from a melt and exhibit good chemical durability, thereby allowing the compositions to be employed in various chemical environments.

These and additional objects and advantages provided by the compositions of the present invention will be more fully understood in view of the following detailed description.

DETAILED DESCRIPTION

The glass compositions according to the present invention absorb low energy thermal neutrons. Excess energy resulting from thermal neutron capture results in charged particles which generally do not pose radiological problems. The excess energy does not result in the release of gamma rays.

The glass compositions of the invention comprise $SiO_2$ and $^6Li_2O$. Preferably, the glass compositions according to the present invention comprise $SiO_2$, and $^6Li_2O$ and $Al_2O_3$. The $SiO_2$ is included in the compositions in an amount sufficient to provide the compositions with a glass matrix. Preferably, the $SiO_2$ is included in an amount of from about 40 to about 80 weight percent, and more preferably in an amount of at least 50 weight percent, based on the $SiO_2$, the $^6Li_2O$ and the $Al_2O_3$ combined. In a further preferred embodiment, the $SiO_2$ is included in an amount of from about 50 to about 75 weight percent based on the $SiO_2$, the $^6Li_2O$ and the $Al_2O_3$ combined.

The $^6Li_2O$ is included in the compositions in an amount sufficient to provide the compositions with neutron absorbing properties. However, high concentrations of $^6Li$ promote crystallization in the compositions. Additionally, there is a limit to the miscibility of $^6Li$ in a silica matrix. Accordingly, it is preferred that the compositions according to the present invention contain from about 1 to about 30 weight percent $^6Li_2O$, and more preferably at least 10 weight percent $^6Li_2O$, based on the $SiO_2$, the $^6Li_2O$ and the $Al_2O_3$ combined. In a more preferred embodiment, the compositions according to the present invention contain from about 10 to about 25 weight percent $^6Li_2O$, based on the $SiO_2$, the $^6Li_2O$ and the $Al_2O_3$ combined.

The $Al_2O_3$ is included in the compositions of the present invention in an amount sufficient to inhibit crystallization in the compositions when the compositions are formed from a melt. Additionally, the $Al_2O_3$ lowers the liquidus temperature of the glass compositions and provides the compositions with increased chemical durability, particularly in the presence of water or moisture. Preferably, the $Al_2O_3$ is included in the compositions of the present invention in an amount of from about 1 to about 25 weight percent, and more preferably not greater than 15 weight percent, based on the $SiO_2$, the $^6Li_2O$ and the $Al_2O_3$ combined. In a more preferred embodiment, the compositions of the invention contain from about 1 to about 15 weight percent $Al_2O_3$, based on the $SiO_2$, the $^6Li_2O$ and the $Al_2O_3$ combined.

The compositions of the present invention may include additional components if desired. For example, the compositions may further include PbO which assists the $Al_2O_3$ in inhibiting crystallization of the melt and in lowering the liquidus temperature of the glass compositions. In a preferred embodiment of the compositions of the present invention containing lead oxide, the compositions contain from about 40 to about 80 weight percent $SiO_2$, from about 1 to about 30 weight percent $^6Li_2O$, from about 1 to about 15 weight percent $Al_2O_3$ and from about 1 to about 25 weight percent PbO.

Further additives may also be included in the compositions of the present invention, for example, to enhance the glass-forming ability of the compositions. However, care should be exercised that the additives are not detrimental to the intended use of the compositions and, particularly, that the additives do not generate unacceptable gamma radiation. Suitable elements which would be acceptable for addition to the compositions of the present invention in view of their low capture cross section include Mg, Be, $^{11}B$, F, P and Bi. These elements may be added in various forms, for example, as oxides or fluorides.

The compositions of the invention which comprise $SiO_2$ and $^6Li_2O$, and which do not include $Al_2O_3$, preferably contain at least 5 weight percent, and more preferably about 10 weight percent, of the $^6Li_2O$ based on the $SiO_2$ and the $^6Li_2O$.

The glass compositions according to the present invention may be easily prepared from a melt. For example, powders of the oxide components or precursors thereof may be mixed together, for example, in a mill, and then heated to form a molten glass, for example, at a temperature of from about 1250° C. to about 1400° C. The molten glass is then cooled to form a solid and may then be annealed to remove residual stresses therefrom. Annealing may be conducted at temperatures in the range of about 350° C. to about 500° C. Specifically, the molten glass compositions may be cast in hot molds, for example, of metal or graphite, to form rings, cylinders and other intricate shapes. The cooling rate of the hot melt may be controlled in order to provide a rough anneal to the cast piece. The glass compositions may also be cooled quickly below the liquidus temperature prior to annealing, for example, by casting in a cooled mold in slab form. Alternatively, large sheets of the glass compositions may be formed using a float glass process similar to that employed to form conventional commercial glass as is well known in the art.

The compositions of the present invention are illustrated by way of the following examples.

EXAMPLE 1

A mixture containing 70 weight percent $SiO_2$ powder, 22 weight percent $^6Li_2O$ powder and 8 weight percent $Al_2O_3$ powder was formed by mixing the respective powders in a mill for one to two hours. The powders were then placed in a platinum crucible and heated to 1300° to 1350° C. to form a molten composition. The molten glass was then poured into a steel mold and cooled to form a solid. The solid was then annealed at 400° to 450° C. in order to remove residual stresses from the glass. Using this procedure, the glass composition was formed into various pieces having thicknesses of 20 mm or less.

EXAMPLE 2

A mixture comprising 60 weight percent $SiO_2$ powder, 14 weight percent $^6Li_2O$ powder, 8 weight percent $Al_2O_3$ powder and 18 weight percent PbO powder was formed by mixing the powders in a mill for one to two hours. The general procedure of Example 1 was followed to form a glass product with the exception that the molten glass was poured into a heated graphite mold to provide slower cooling from the pouring temperature and to prevent cracking of the cast piece. A conventional annealing procedure was also followed after cooling in the graphite mold.

The preceding examples are set forth to illustrate specific embodiments of the invention and not intended to limit the scope of the compositions and methods of the present invention. Additional embodiments and advantages within the scope of the claimed invention will be apparent to one of ordinary skill in the art.

What is claimed is:

1. A glass composition consisting essentially of from about 50 to about 80 weight percent $SiO_2$, from about 1 to about 30 weight percent $^6Li_2O$, and from about 1 to about 25 weight percent $Al_2O_3$.

2. A glass composition as defined by claim 1, wherein the $^6Li_2O$ is present in an amount of at least 10 weight percent.

3. A glass composition as defined by claim 1, wherein the $Al_2O_3$ is present in an amount not greater than 15 weight percent.

4. A glass composition as defined by claim 1, consisting essentially of from about 60 to about 75 weight percent $SiO_2$, from about 10 to about 25 weight percent $^6Li_2O$, and from about 1 to about 15 weight percent $Al_2O_3$.

5. A glass composition as defined by claim 1, wherein the composition further includes at least one additional component containing an element selected from the group consisting of Mg, Be, $^{11}B$, F, P and Bi.

6. A glass composition as defined by claim 5, wherein the at least one additional component is in the form of an oxide or a fluoride.

7. A glass composition as defined by claim 1, wherein the composition is formed by the steps of mixing $SiO_2$, $^6Li_2O$ and $Al_2O_3$ powders or their precursor powders, heating the resulting mixture to form a molten glass, cooling the molten glass to form a solid, and annealing the solid to remove residual stresses therefrom.

8. A glass composition as defined by claim 7, wherein the mixture is heated to a temperature of from about 1250° C. to about 1400° C. to form a molten glass.

9. A glass composition as defined by claim 7, wherein the solid is annealed at a temperature of from about 350° C. to about 500° C.

10. A glass composition as defined by claim 5, wherein the additional component is present in an amount which does not generate gamma radiation.

11. A glass composition as defined by claim 1, wherein the glass absorbs neutrons without the release of gamma rays.

12. A glass composition consisting essentially of from about 40 to about 80 weight percent $SiO_2$, from about 1 to about 30 weight percent $^6Li_2O$, from about 1 to about 15 weight percent $Al_2O_3$, and from about 1 to about 25 weight percent PbO.

13. A glass composition as defined by claim 12, wherein the glass absorbs neutrons without the release of gamma rays.

14. A glass composition, consisting essentially of $SiO_2$ and $^6Li_2O$, the $^6Li_2O$ being present in an amount of at least 5 weight percent based on the $SiO_2$ and $^6Li_2O$.

15. A glass composition as defined by claim 14, wherein the $^6Li_2O$ is present in an amount of at least 10 weight percent based on the $SiO_2$ and $^6Li_2O$.

* * * * *